US011465215B2

(12) United States Patent
Roth

(10) Patent No.: US 11,465,215 B2
(45) Date of Patent: Oct. 11, 2022

(54) FACING HEAD AND METHOD FOR CLAMPING AND RELEASING A TOOL IN OR FROM A TOOL HOLDER DEVICE OF THE FACING HEAD

(71) Applicant: Gebr. Heller Maschinenfabrik GmbH, Nuertingen (DE)

(72) Inventor: Werner Roth, Lenningen (DE)

(73) Assignee: GEBR. HELLER MASCHINENFABRIK GMBH, Nuertingen (DE)

(*) Notice: Subject to any disclaimer, the term of this patent is extended or adjusted under 35 U.S.C. 154(b) by 49 days.

(21) Appl. No.: 16/776,094

(22) Filed: Jan. 29, 2020

(65) Prior Publication Data

US 2020/0238406 A1    Jul. 30, 2020

(30) Foreign Application Priority Data

Jan. 29, 2019   (DE) .......................... 10201910215.8

(51) Int. Cl.
*B23B 29/034* (2006.01)
*B23B 31/26* (2006.01)
(Continued)

(52) U.S. Cl.
CPC ...... *B23B 29/03439* (2013.01); *B23B 31/265* (2013.01); *B23B 31/026* (2013.01); *B23B 31/06* (2013.01)

(58) Field of Classification Search
CPC . B23B 29/03439; B23B 31/026; B23B 31/06; B23B 31/265
See application file for complete search history.

(56) References Cited

U.S. PATENT DOCUMENTS 3,709,623 A * 1/1973 Stephan ............... B23Q 16/065
483/54
3,842,712 A * 10/1974 Bondie ............... B23Q 3/1552
408/238
(Continued)

FOREIGN PATENT DOCUMENTS

DE           1777296 U     11/1958
DE           240158 A1     10/1986
(Continued)

OTHER PUBLICATIONS

German Office Action for Application No. 10 2019 102 158.8; dated May 19, 2021.
(Continued)

*Primary Examiner* — Eric A. Gates
(74) *Attorney, Agent, or Firm* — Canton Colburn LLP

(57) ABSTRACT

A facing head as well as a method for inserting a tool into and/or removing a tool from a tool holder device of the facing head. The facing head has a spindle coupling device for exchangeably coupling with a spindle chuck of a working spindle of a machine tool. The facing head has a housing body at which or in which a facing slide is moveably supported in a guided manner. The facing slide supports the tool holder device. The tool holder device is hydraulically controllable. A hydraulic coupling that is mechanically and hydraulically coupled with an associated hydraulic control coupling of the housing body in a tool change position of the facing slide. Remote from the tool change position, the mechanical and hydraulic connection between the hydraulic coupling and the associated hydraulic control coupling is interrupted. In the tool change position a switching of the tool holder device between a hold condition holding the tool and a release condition releasing the tool can be carried out by a respective pressurization with hydraulic pressure.

18 Claims, 6 Drawing Sheets

(51) Int. Cl.
  *B23B 31/02*  (2006.01)
  *B23B 31/06*  (2006.01)

(56) References Cited

U.S. PATENT DOCUMENTS

| | | | | |
|---|---|---|---|---|
| 4,148,246 A | * | 4/1979 | Johnson | B23B 31/265 408/239 A |
| 4,620,824 A | * | 11/1986 | Eckstein | B23Q 3/12 408/124 |
| 4,692,074 A | * | 9/1987 | Smith | B23B 31/265 409/231 |
| 5,125,234 A | * | 6/1992 | Yonezawa | F15B 11/0325 60/563 |
| 5,707,186 A | * | 1/1998 | Gobell | F16L 27/082 285/94 |
| 5,795,114 A | * | 8/1998 | Schweizer | B23Q 3/15553 409/230 |
| 5,909,988 A | * | 6/1999 | Hoppe | B23Q 5/54 409/234 |
| 7,972,096 B2 | * | 7/2011 | Kikkawa | B23B 31/265 408/56 |
| 8,382,405 B2 | * | 2/2013 | Soshi | B23Q 5/10 409/137 |
| 8,827,609 B2 | * | 9/2014 | Ogura | B23Q 11/0039 409/141 |
| 10,369,634 B2 | * | 8/2019 | Kitamura | B23B 31/117 |

FOREIGN PATENT DOCUMENTS

| | | |
|---|---|---|
| DE | 9007396 U1 | 7/1991 |
| DE | 19537070 A1 | 3/1997 |
| DE | 202006009984 U1 | 9/2006 |
| DE | 102018121554 A1 | 3/2020 |
| EP | 3417992 A1 | 12/2018 |
| JP | 2003326405 A | 11/2003 |

OTHER PUBLICATIONS

Selbsthemmende Spanneinheit. Self-locking clamping unit. Date of Publication: Aug. 17, 2009. Retrieved from: https://www.berg-spanntechnik.de/wAssets/docs/produkte/werkzeugspannung/shr.pdf.

* cited by examiner

FACING HEAD AND METHOD FOR CLAMPING AND RELEASING A TOOL IN OR FROM A TOOL HOLDER DEVICE OF THE FACING HEAD

CROSS REFERENCE TO RELATED APPLICATIONS

This application claims priority under 35 U.S.C. § 119 to the following German Patent Application No. 10 2019 102 158.8, filed on Jan. 29, 2019, the entire contents of which are incorporated herein by reference thereto.

TECHNICAL FIELD

The invention refers to a facing head as well as a method for clamping a tool in a tool holder device of a facing head as well as a method for releasing a tool held in the tool holder device of the facing head.

BACKGROUND

A facing head is a device that is connectable with a working spindle of a machine tool, wherein the facing head comprises a tool holder device for a tool. The tool can have one or more blades and can be, for example, a lathe tool. The facing head can be rotatingly driven together with the working spindle of the machine tool. During this rotation movement the tool held at the facing head can change its position relative to the rotation axis such that during the operation the diameter of the flying circle of the tool and thus the at least one blade can change. With such a facing head it is possible to machine different radii of a workpiece in an automatic manner.

DD 24 01 58 A1 describes a facing, rotating and milling head that can be connected with a working spindle of a machine. This facing, rotating and milling head comprises a housing that is exchangeably accommodated in the machine. In a tool holder device a tool with shank taper can be inserted, which receives a rotation movement transmission via driving keys and is clamped by clamping elements. The clamping elements are biased in a clamping position by means of a spring force biasing and can be actuated against the spring force via pressing bolts and a planetary disc with guide cams in order to change a tool.

DE 1 777 296 A describes a facing head with a tool holder device arranged at a facing slide. The tool holder device comprises a clamping screw. In a tool change position of the facing slide the clamping screw can be mechanically actuated.

Additional facing heads are known from JP 2003-326405 A as well as DE 195 37 070 C2.

With such facing heads adjustment movements of the tool held in the tool holder device can be carried out during the rotation of the working spindle of a machine tool. In doing so, the flying circle path of the tool can be changed or adjusted. In order to be able to carry out such an adjustment movement, the tool holder device must be moveably supported. Typically the tool holder device is arranged at a facing slide that is moveable by means of an adjustment device. For this the adjustment device can be coupled with the working spindle by a respective drive shaft. In addition, means are required in order to allow the holding and release of the tool in the tool holder device.

BRIEF SUMMARY

It can thus be an object of the present invention to provide a facing head that allows a simple exchange of a tool arranged at the facing head, which can be particularly carried out automatically.

This task is solved by a facing head according to the features of claim 1 as well as a method according to the features of claims 14 and 15.

Disclosed is a facing head for use in a machine tool that includes at least one working spindle, the facing head having: a housing body that comprises a spindle coupling device that is configured to be exchangeably coupled with a spindle chuck of the working spindle of the machine tool, wherein the spindle coupling device is arranged coaxially to a rotation axis; a facing slide that is moveably supported in a guided manner at or in the housing body, wherein a hydraulically controllable tool holder device is arranged at the facing slide configured for holding a tool, wherein the facing slide and/or the tool holder device comprises at least one hydraulic coupling by means of which a hydraulic pressure in at least one working chamber of the tool holder device can be changed in order to switch the tool holder device between a hold condition holding the tool and a release condition releasing the tool; and an adjustment device that is configured to move the facing slide relative to the housing body between a tool change position and at least one working position that is different from the tool change position, wherein in the tool change position the at least one hydraulic coupling of the tool holder device is fluidically connected with a hydraulic control coupling provided at the housing body and wherein in the at least one working position the at least one hydraulic coupling is fluidically disconnected from the assigned hydraulic control coupling.

Also disclosed is a method for clamping a tool in a tool holder device of a facing head that is arranged at a facing slide that is moveably supported in a guided manner at or in a housing body of the facing head and that can be moved by means of an adjustment device, the method including the steps of: moving the facing slide in a tool change position, in which a fluidic connection between at least one hydraulic coupling of the facing slide and/or the tool holder device and an assigned hydraulic control coupling at the housing body is established; hydraulically switching the tool holder device in a release condition, in which a tool can be inserted in the tool holder device; arranging of a tool in the tool holder device; hydraulically switching the tool holder device in a hold condition, in which the tool is fixedly retained in the tool holder device; and moving the facing slide in a working position relative to the housing body that is different from the tool change position, whereby the at least one hydraulic coupling is fluidically disconnected from the at least one hydraulic control coupling.

Also disclosed is a method for releasing a tool arranged in a tool holder device of a facing head, wherein the tool holder device is arranged at a facing slide that is moveably supported in a guided manner at a housing body of the facing head and that can be moved by means of an adjustment device, the method including the steps of: moving the facing slide in a tool change position, in which a fluidic connection between at least one hydraulic coupling of the facing slide and/or the tool holder device and a respective hydraulic control coupling provided at the housing body is established; hydraulically switching the tool holder device in a release condition, in which the tool can be removed from the tool holder device; and removing the tool that is arranged in the tool holder device.

The inventive facing head is configured for use in a machine tool that comprises at least one working spindle. The facing head has a housing body. At the housing body a spindle coupling device is provided that is configured to be exchangeably coupled with a spindle chuck of the working spindle of the machine tool. The spindle coupling device is centrically or coaxially arranged with a rotation axis about which the working spindle rotates and about which the working spindle can thus initiate a rotation of the facing head. Preferably the spindle coupling device is configured such that the insertion or the removal of the facing head in or out of the spindle chuck can be carried out by means of a gripping device assigned to the machine tool and can thus be carried out particularly automatically. The spindle coupling device can be a standardized interface and can be formed as a hollow shank taper for example.

The spindle coupling device can in addition also serve as media interface for establishing a fluid connection between the facing head and the working spindle. The spindle coupling device is particularly also configured to establish a hydraulic connection with a hydraulic supply of the working spindle, if the connection with the spindle chuck is established. Via the hydraulic connection hydraulic medium can be supplied and/or discharged to and/or from the facing head. The hydraulic connection can also be established by means of an additional media interface between the facing head and the working spindle.

At or in the housing body of the facing head a moveably guidably supported facing slide is arranged. The facing slide supports a tool holder device that is configured for holding a tool. The tool holder device can be hydraulically controlled in order to switch the tool holder device between a hold condition, in which the tool is held and a release condition, in which the tool is released. For this the facing slide and/or the tool holder device comprises at least one hydraulic coupling. Via the at least one hydraulic coupling a hydraulic pressure can be controlled or adjusted or changed in a working chamber of a tool holder device. Depending on the adjusted hydraulic pressure, the tool holder device can be switched in the hold condition or in the release condition or can be kept in the reached hold condition or release condition. In a preferred embodiment the hydraulic pressure serves at least to carry out the switching movement between the hold condition and the release condition. Additionally or alternatively, the hydraulic pressure—particularly the hydraulic pressure that was adjusted for switching—can be maintained in order to keep the respective hold condition or release condition. It is particularly advantageous, if the tool holder device is configured such that the hold condition can be maintained by a self-locking effect independent from whether the hydraulic pressure provided for switching the tool holder device in the hold condition can be maintained or not.

The tool holder device is preferably configured such that a tool can be inserted or removed by means of a gripping device assigned to the machine tool, particularly in an automated manner. Preferably the tool holder device is a standardized interface that can be configured as fixture for a hollow shank taper (HSK).

The facing head further comprises an adjustment device that is configured to move the tool holder device relative to the housing body. The adjustment device can comprise an adjustment gear transmission or can be formed by an adjustment gear transmission.

By means of the adjustment device the facing head can be moved relative to the housing body between a tool change position and at least one working position that is different from the tool change position. The at least one hydraulic coupling of the facing head and/or the tool holder device is fluidically connected with an assigned hydraulic control coupling in the tool change position wherein the hydraulic control coupling is provided at the housing body. On the other hand, the at least one hydraulic coupling is fluidically disconnected from the assigned hydraulic control coupling at the housing body in the at least one working position.

The tool change position is preferably a position at an end range of the possible movement path of the facing slide. The tool change position can be a position outside provided maximum position range of the working positions of the facing slide that can be reached, e.g. by an overstroke or additional movement path.

By means of the adjustment device the facing slide can thus be brought into the tool change position. There the at least one hydraulic coupling can be pressurized with the hydraulic pressure via the assigned hydraulic control coupling in order to switch the tool holder device in the release condition, in order to carry out a tool exchange or to insert a tool and in order to subsequently switch the tool holder device in the hold condition again. Subsequently, the facing slide can be brought into the desired working position. The hydraulic medium that is present in the at least one working chamber can remain enclosed. Due to the disconnection from the at least one hydraulic control coupling at the housing body, the hydraulic volume and the hydraulic pressure inside the facing slide and the tool holder device remain substantially constant. During the operation the working spindle rotates and is also discoupled from a hydraulic reservoir such that a control of feedback control of the hydraulic pressure is not possible. By disconnecting the hydraulic flow connection between the facing slide or the tool holder device and the housing body outside the tool change position, it is avoided that the hydraulic pressure changes inside the working chamber depending on the movement of the facing slide relative to the housing body, which would be, e.g. the case if the length of a telescopic hydraulic supply line increases or decreases during the movement of the facing slide. In addition, the use of flexible hose lines is avoided.

Thus, hydraulic medium provided at the working spindle or the spindle chuck can be used for an automatic switching between the release and the hold condition of the tool holder device, in that the facing slide is moved in the tool change position and thus a hydraulic flow connection between the facing head and the tool holder device is established.

Preferably the at least one hydraulic coupling is provided with an unlockable shut-off valve. The shut-off valve or the assigned hydraulic control coupling can be configured such that the shut-off valve is automatically unlocked, if the facing slide takes the tool change position. The shut-off valve can be configured such that it is only unlockable or unlocked in the tool change position. For unlocking, unlocking means can be provided at the hydraulic control coupling. The unlocking means can be configured to lift a valve member from a valve seat of the shut-off valve against a spring force—for example due to contact with an unlocking lifter or nozzle—in order to establish the fluid connection between the hydraulic control coupling and the hydraulic coupling. The unlocking means can also apply an additional hydraulic pressure at an optional control input of the shut-off valve in order to unlock it in a pressure control manner. The unlocking means can thus operate mechanically and/or hydraulically.

Preferably the tool holder device comprises a clamping body that is moveably arranged in a clamping direction in a holder body of the tool holder device. For example, the clamping body can be moved in a clamping position in order to switch the tool holder device in the hold condition. For example, the clamping body can be moved in a relief position in order to switch the tool holder device in the release condition.

In an embodiment the tool holder device comprises a first working chamber that is fluidically connected with the first hydraulic coupling. The first working chamber is fluidically sealingly closed at one side by a moveably arranged piston. The piston is moveably coupled with the clamping body. In one configuration with a single hydraulic working chamber the clamping body can be biased in its clamping position by biasing means, e.g. by spring washers. The clamping body can be moved against the biasing force out of the clamping position in the relief position, if a force is applied on the piston.

In another embodiment the tool holder device comprises a double-acting hydraulic cylinder with a first working chamber and a second working chamber. The two working chambers are fluidically separated by the piston. The second working chamber is fluidically connected with a second hydraulic coupling. In this configuration the clamping body can be hydraulically operated and moved in the clamping position or the relief position. A biasing means can be provided in this configuration as an option, it is however not necessary.

Preferably the tool holder device comprises a self-locking means. The self-locking means is configured to keep the clamping body by means of a self-locking effect in the clamping position. The self-locking effect is preferably created by a force acting on the clamping body and the clamping position that urges the clamping body from the clamping position in direction toward the relief position is transmitted into a clamping force by means of the self-locking means that applies in a direction orthogonal to the force applied on the clamping body. This clamping force hinders or blocks a relative movement between the clamping body and the holder body.

In one embodiment the self-locking means comprises a wedge body. In the clamping position the wedge body is supported at the holding body by a first wedge surface and is supported by a second wedge surface at the piston. The clamping body is particularly moveably coupled with the wedge body. Each wedge surface can be in contact with a respective assigned wedge counter surface. The wedge body tapers due to its two wedge surfaces preferably in a direction in which the clamping body moves during a movement from the clamping position in the relief position. In doing so, a clamping of the wedge body between the piston and the holding body is effected, if a pulling force acts on the wedge body, which hinders the clamping body to move out of the clamping position.

In a preferred embodiment the facing slide and/or the tool holder device comprise an additional cooling medium coupling and/or an additional compressed air coupling. If an additional compressed air coupling is provided, the tool holder device can be cleaned from pollution by using compressed air for example. Another possibility for using the compressed air is a check whether a tool is correctly positioned in the tool holder device. In the correct position compressed air openings at the tool holder device, that can be provided as an option, can be closed such that compressed air supplied to the compressed air openings cannot escape. Based on a pressure measurement the correct seat of the tool can be determined.

If a cooling medium coupling is present, cooling media can be supplied directly to the tool holder device for cooling or lubricating the tool.

In a preferred embodiment the additional cooling medium coupling and/or the additional compressed air coupling is always fluidically connected with an assigned supply coupling at the housing body, independent from the position of the facing slide relative to the housing body. For the cooling medium coupling a cooling medium supply coupling can be provided at the housing body. For the compressed air coupling a compressed air supply coupling can be provided at the housing body. Particularly the fluidic coupling between one of the supply couplings and the housing body and the respective cooling medium coupling or compressed air coupling at the facing slide or the tool holder device can be established by a supply tube that telescopically engages into a supply channel or supply bore at the tool holder device or the facing slide, such that a telescopic shifting relative to each other is achieved. The at least one supply tube and the at least one supply bore extend in a shift direction in which the facing slide is moved and are dimensioned such that the maximum movement range of the facing slide can be exhausted.

For releasing a tool the facing slide is first moved in the tool change position. In doing so, a fluidic connection between the at least one hydraulic coupling of the tool holder device and the assigned hydraulic control coupling at the housing body is established. By means of respective pressurization, the tool holder device is hydraulically switched in the release condition and the tool held in the tool holder device can be removed.

As long as the facing slide is in the tool change position, the tool can be inserted in the tool holder device for being clamped. Subsequently a hydraulic switching of the tool holder device in the hold condition can be carried out due to a respective pressurization of the at least one working chamber of the tool holder device via the at least one hydraulic control coupling and the respectively assigned hydraulic coupling. After the tool holder device has assumed the hold condition, the facing slide can be moved relative to the housing body in the desired working position. Due to this movement, the at least one hydraulic coupling is fluidically disconnected from the assigned hydraulic control coupling.

BRIEF DESCRIPTION OF THE DRAWINGS

Preferred embodiments of the invention can be derived from the dependent claims, the specification and the drawings. In the following preferred embodiments of the invention are explained in detail based on the attached drawings. The figures in the drawings show:

DETAILED DESCRIPTION

Figure 1:
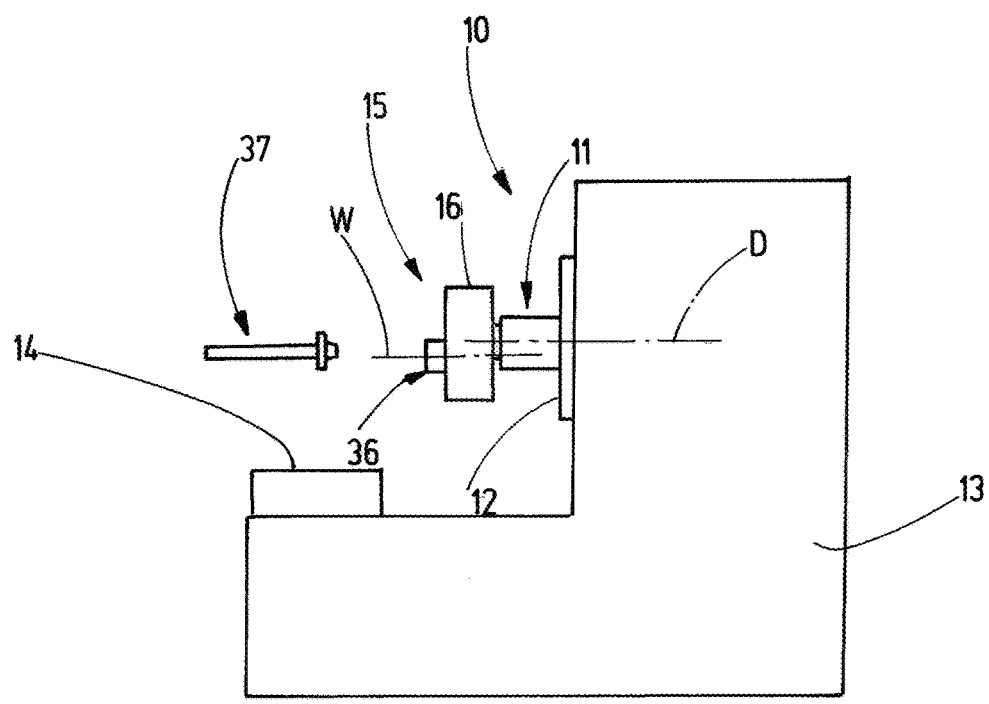
FIG. 1 a machine tool with an embodiment of a facing head in a schematic side view, FIG. 2 the embodiment of the facing head of FIG. 1 in a schematic side view, FIG. 3 a block diagram-like basic illustration of the embodiment of the facing head of FIGS. 1 and 2, FIG. 4 a schematic basic illustration of an embodiment of a facing head with an exemplary embodiment of a tool holder device in a longitudinal section, FIG. 5 an embodiment of a facing head in a schematic basic illustration with view along a tool axis of the tool holder device, FIG. 6 a basic illustration of a facing slide and housing body of the facing head in a partial illustration to illustrate the fluidic connection between the housing body and the facing slide or the tool holder device, wherein the facing slide is in a working position, FIG. 7 the partial view of the facing slide and the housing body of FIG. 6, wherein the facing slide is in a tool change position and FIG. 8 a schematic basic illustration of an embodiment of a facing head in a longitudinal section according to FIG. 4 with a modified embodiment of a self-locking means of the tool holder device.

FIG. 1 illustrates a machine tool 10 with at least one working spindle 11 that is at least moveable in one spacial direction, e.g. vertically and/or horizontally, and is for this arranged on a slide 12 that is moveable relative to a machine frame 13. The working spindle 11 can be rotatably driven about a rotation axis D. The machine tool 10 further comprises a workpiece holder 14, at which a workpiece can be held or clamped. The workpiece holder 14 can also be moveably arranged at the machine frame 13 of the machine tool 10. For moving the working spindle 11 and/or the workpiece holder 14, the machine tool 10 can comprise respective linear axes and/or rotation axes or pivot axes. The number of the linear axes and/or the number of the rotation or pivot axes can vary depending on the configuration of the machine tool 10. Preferably four to five machine axes are present in order to move and position the workpiece and the working spindle 11 in a corresponding number of degrees of freedom relative to each other and/or relative to the machine frame 13.

A facing head 15 can be attached to the working spindle 11. The facing head 15 has a housing body 16 at which a spindle coupling device 17 is arranged. The spindle coupling device 17 is configured to be exchangeably arranged at a spindle chuck 18 of the working spindle. Particularly the spindle coupling device 17 can be configured as standardized interface, e.g. as hollow shank taper 19. In addition, the spindle coupling device 17 can contain a grip body 20, particularly a grip disc. The grip body 20 is configured to be coupled with a non-disclosed gripping device such that an automatic insertion or removal of the facing head 15 in the spindle chuck 18 or from the spindle chuck 18 by the gripping device is possible.

The spindle coupling device 17 or the hollow shank taper 19 are arranged coaxially to the rotation axis D of the working spindle, if the facing head 15 is arranged at the working spindle 11.

Figure 3:
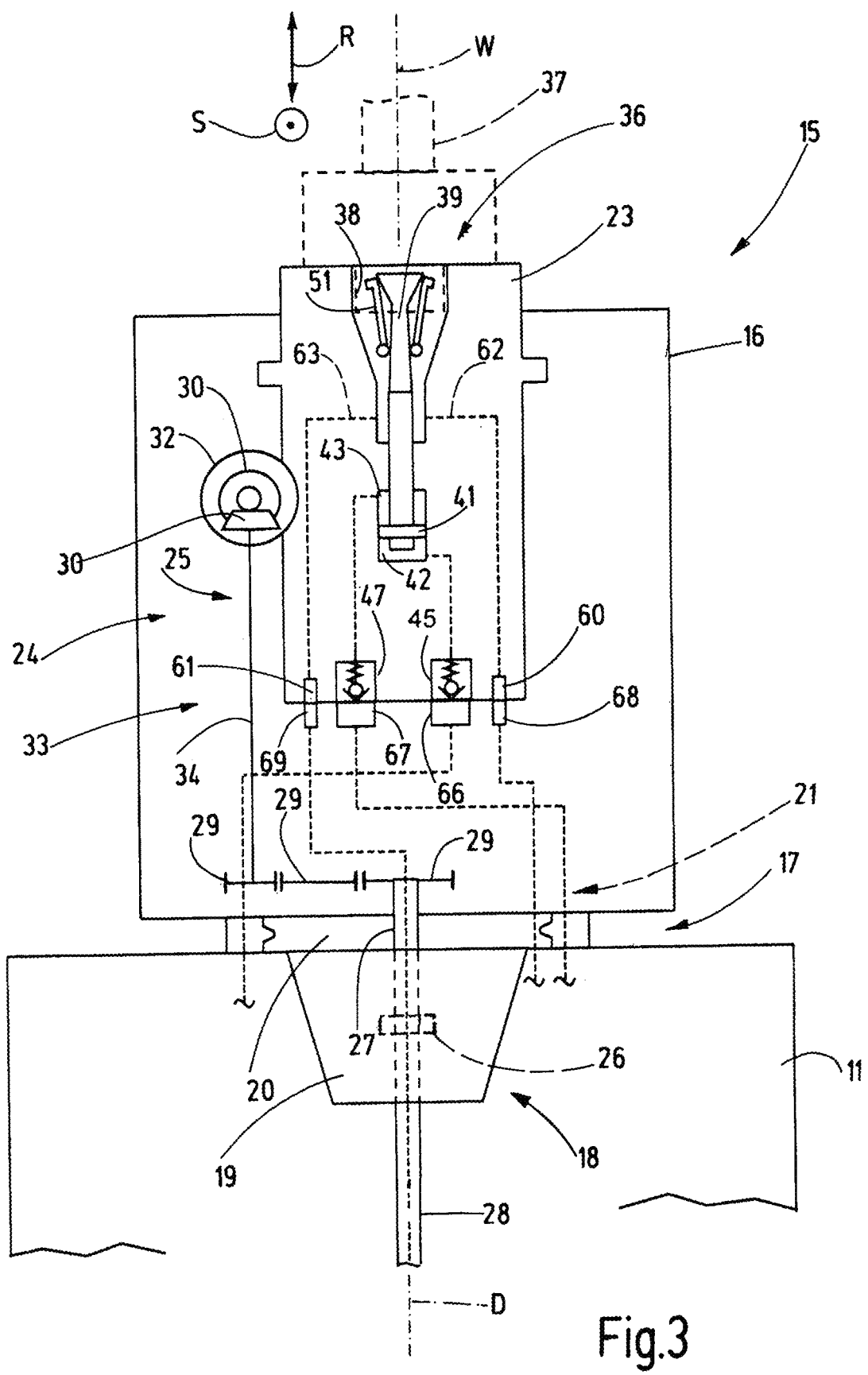

In the embodiment the spindle coupling device 17 comprises in addition also a media interface 21 for establishment of a fluid connection between the facing head 15 and the working spindle 11 (FIG. 3).

The facing head 15 is configured to be provided in a non-disclosed tool magazine and to be automatically removed from the tool magazine and inserted into the spindle chuck 18 of the working spindle 11 by the gripping device or in the opposite sense to be automatically removed from the spindle chuck 18 and to be stored in the tool magazine by the gripping device. The relative movement between the gripping device and the spindle chuck 18 can be carried out by one or more drives of the gripping device and/or one or more of the machine axes.

Figure 5:
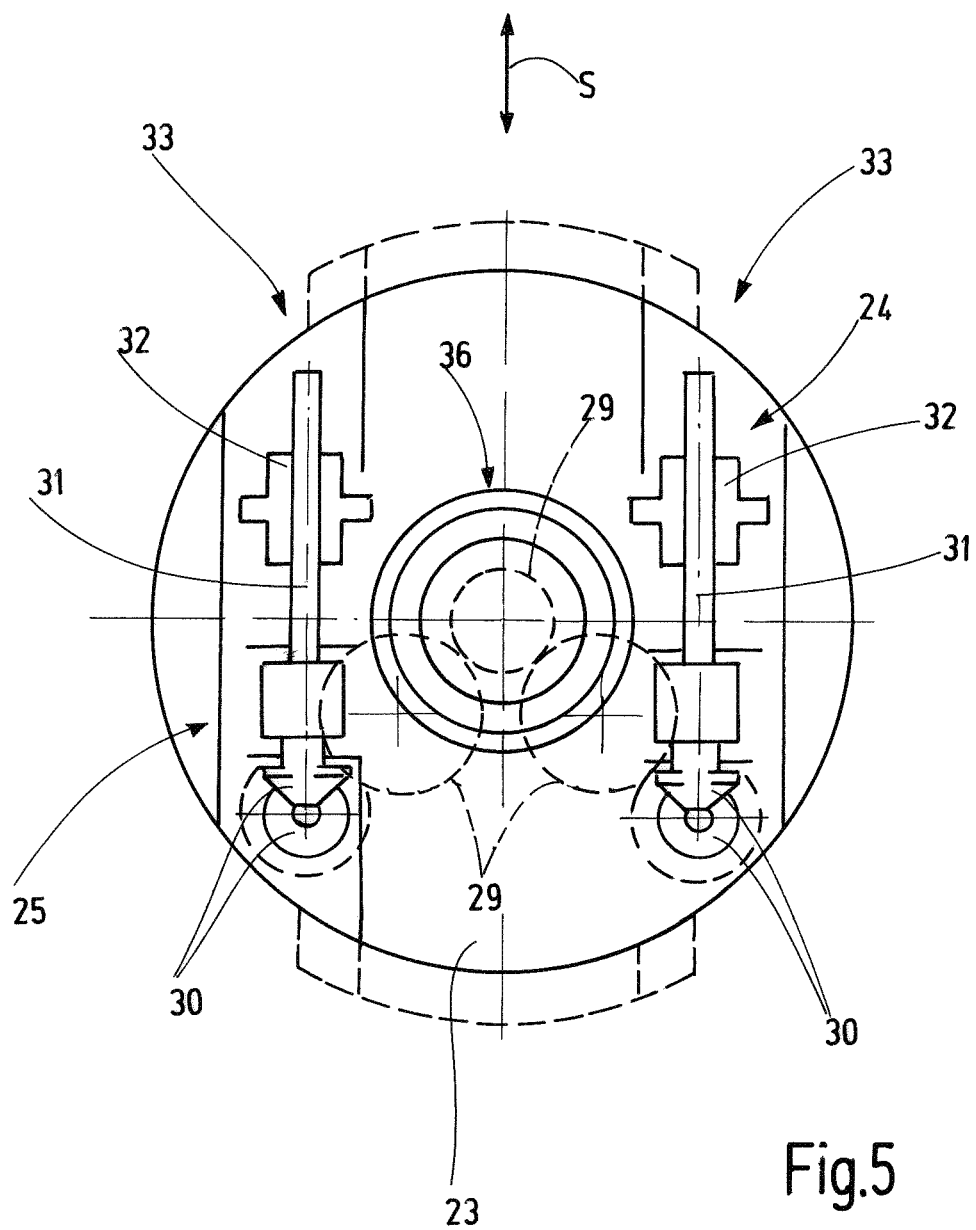

At or in the housing body 16 a facing slide 23 is moveably supported in a guided manner. In the embodiment the facing slide 23 can be linearly moved in a shift direction S. In the embodiment the shift direction S is orientated orthogonal to the rotation axis D and particularly radial to the rotation axis D, if the facing head 15 is arranged at the working spindle 11. For shifting the facing slide 23, an adjustment device 24 is present that is schematically illustrated in FIGS. 3 and 5. The adjustment device 24 has an adjustment gear transmission 25 that couples the facing slide 23 with a shaft coupling 26 that is present in the working spindle 11, if the facing head 15 is arranged at the working spindle 11. The shaft coupling 26 connects an input shaft 27 of the adjustment gear transmission 25 with an output shaft 28 of the working spindle 11 that is also called transverse feed shaft when coupling the spindle coupling device 17 with the spindle chuck 18, a drive connection between the output shaft 28 and the input shaft 27 is established by means of the shaft coupling 26. The output shaft 28 rotates together with the working spindle 11 about the rotation axis D. If a relative rotation between the output shaft 28 and the working spindle 11 is initiated via the working spindle 11, this relative rotation can be used to move the facing slide 23 in shift direction S relative to the housing body 16. For this the adjustment gear transmission 25 can contain respective gear transmission elements, like one or more spur gears 29, one or more bevel gears 30 (FIG. 5), one or more threaded spindles 31, one or more screw nuts 32, e.g. planet roller screw nuts, etc.

In the embodiment the rotation movement of the input shaft 27 is transmitted via two gear transmission branches 33 of the adjustment gear transmission 25, wherein each gear transmission branch comprises: an input gear transmission stage with three spur gears 29 according to the example that are connected at the output side with a gear transmission shaft 34 that in turn transmits its rotation via two bevel gears 30 onto a threaded spindle 31. The threaded spindle 31 is arranged parallel to the shift direction S and supports a screw nut 32 moveably coupled with the facing slide 23. In case of a rotation of the threaded spindle 31, the screw nut 32 moves in shift direction S and transmits its movement on the facing slide 23.

The facing slide 23 supports a tool holder device 36 that is configured for holding a tool 37. In the embodiment the tool holder device 36 is a standardized interface and particularly configured to accommodate a hollow shank taper (HSK) of the tool 37. The tool holder device 36 comprises a tool holder space 38 that is accessible for inserting the tool shank, particularly the hollow shank taper of the tool 37. The tool holder space 38 is open to one side that faces away from the spindle coupling device 17. In operation the facing head 15 is therefore arranged between the working spindle 11 and the tool 37.

Figure 2:
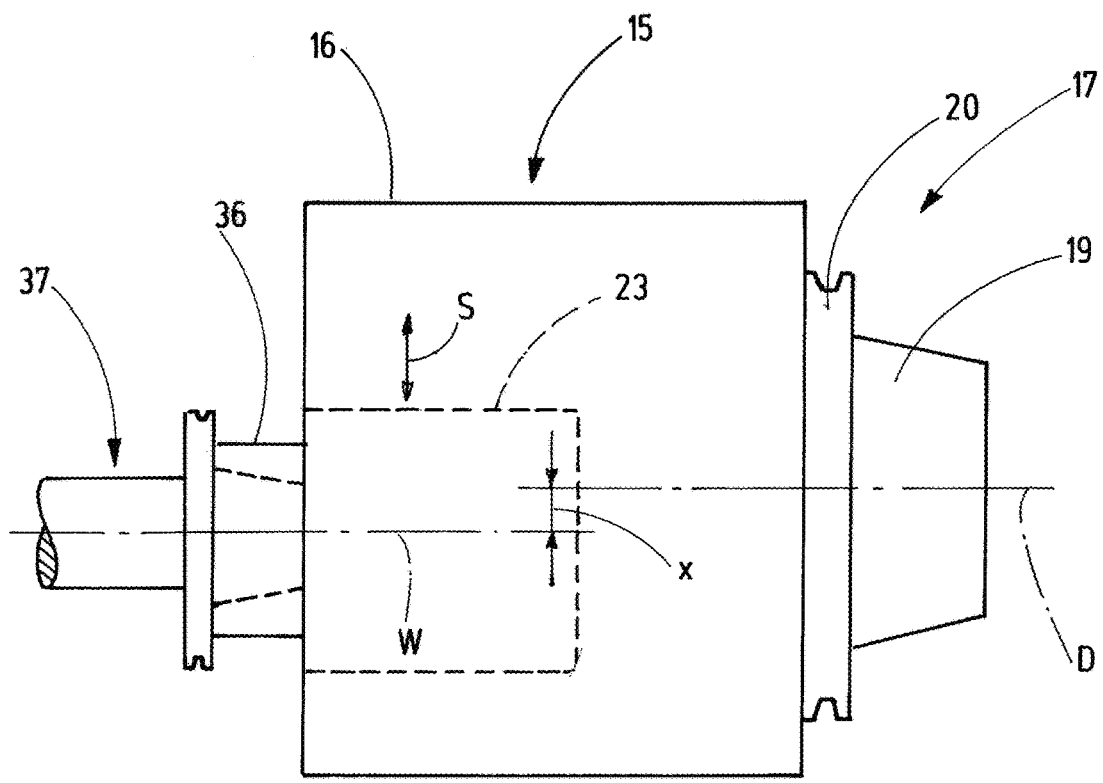

By moving the facing slide 23 in shift direction S, an axis distance x between the rotation axis D of the working spindle 11 and the tool axis W of the tool holder device 36 can be varied (FIG. 2). In doing so, the flying circle path of tool 37 can be adapted to the dimension of the workpiece to be machined during rotation of the facing head 15 about the rotation axis D. This can be advantageous, for example for inside lathing of a hollow cylindrical workpiece.

The tool holder device 36 is hydraulically controllable. It has a clamping body 39 that is moveable in clamping direction R parallel or along a tool axis W. For this the clamping body 39 is moveably supported in a holder body 40 of the tool holder device 36. The holder body 40 can be formed partly or as a whole from the facing slide 23.

For moving the clamping body 39 in clamping direction R, a hydraulically actuable piston 41 is provided that is moveably coupled with the clamping body 39 in clamping direction R. The piston 41 borders at least one working chamber that adjoins the piston 41 and this is fluidically coupled with at least one hydraulic coupling of the facing slide 23 or the tool holder device 36. In the embodiment described here the piston 41 separates a cylinder space in a first working chamber 42 and a second working chamber 43. The two working chambers 42, 43 are fluidically separated from each other by the piston 41. The first working chamber 42 is fluidically coupled with a first hydraulic coupling 45 via a first hydraulic line 44. The second working chamber 43 is fluidically coupled with a second hydraulic coupling 47 via a second hydraulic line 46. If a working chamber 42, 43 is pressurized with hydraulic pressure and if a respective other working chamber 43 or 42 respectively is open to discharge hydraulic medium, the clamping body 39 is moved in clamping direction R, either in a clamping position I or in a relief position II.

Figure 4:
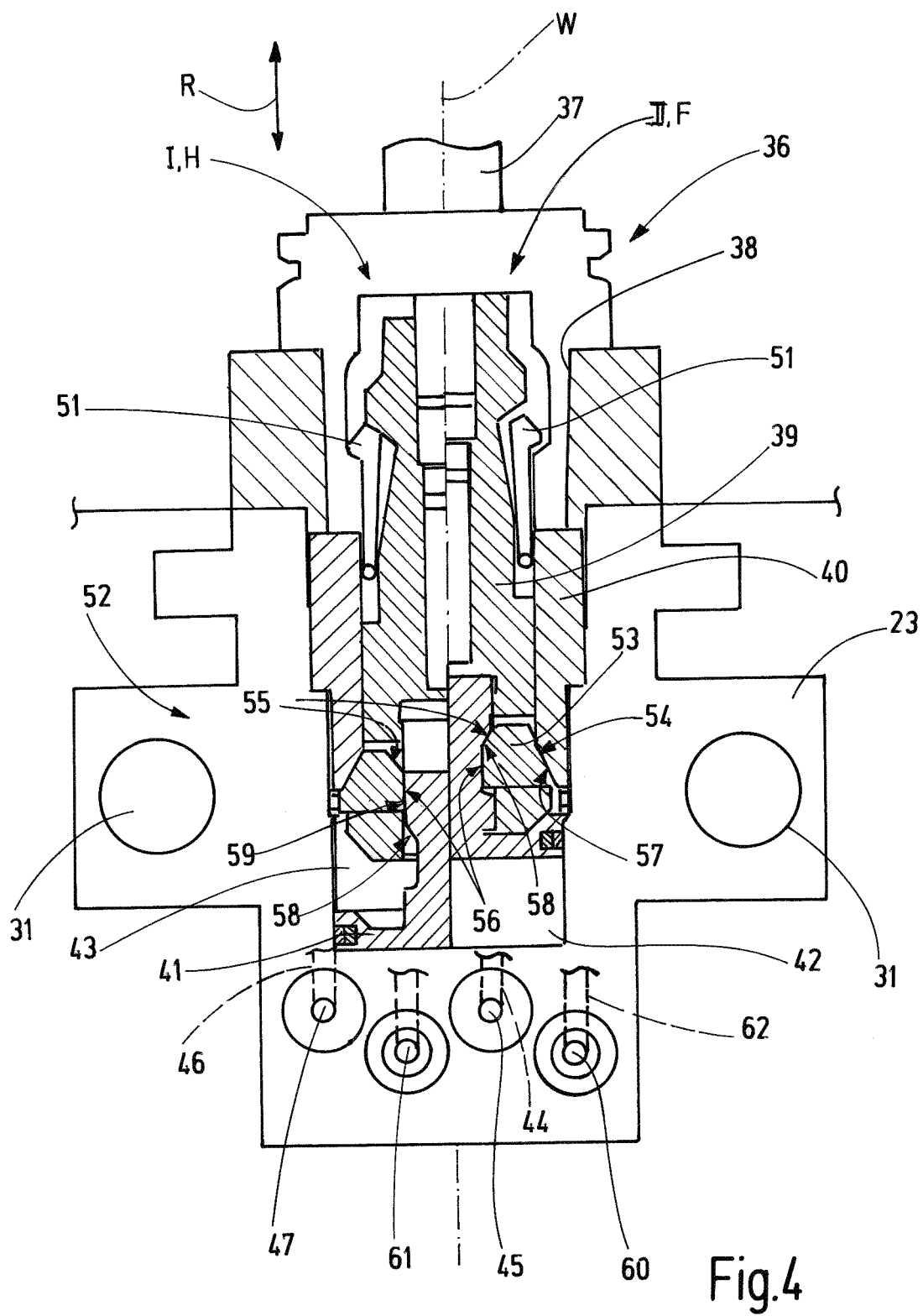

The clamping position I and the relief position II are illustrated in the illustration of FIG. 4 separated along the tool axis W. In the clamping position I the clamping body 39 is retracted and in the relief position II the clamping body 39 is positioned farther away from the spindle coupling device 17. The switching from the clamping position I in the relief position II is achieved, if the first working chamber 42 is pressurized with hydraulic pressure while the hydraulic medium in the second working chamber 43 is allowed to discharge via the second hydraulic line 46 and the second hydraulic coupling 47. Vice versa the switching from the relief position II in the clamping position I is achieved, if the second working chamber 43 is pressurized with hydraulic pressure and the discharge of hydraulic medium from the first working chamber 42 is allowed via the first hydraulic line 44 and the first hydraulic coupling 45.

If the clamping body 39 is in its clamping position I, it urges pivotably supported collet elements 51 in a respective recess at the tool shank of the tool 37. The tool holder device 36 is in a hold condition H (FIG. 4, left side). In this hold condition H the tool 37 is fixedly held at the tool holder device 36 and can be used for machine a workpiece.

If the clamping body 39 is in the relief position II, the collet elements 51 can pivot out of the recess at the tool shank of the tool 37 and the tool 37 can be removed from the tool holder device 36. The tool holder device 36 is in the release condition F (FIG. 4, right side).

In the embodiment illustrated here the collet elements 51 are urged radially outward away from the tool axis W in the clamping position I of the clamping body 39. Alternatively, it is also possible to urge the collet elements 51 in the clamping position I of the clamping body 39 radially inward toward the tool axis W. The configuration depends on the type of interface between the tool 37 and the tool holder device 36.

As also illustrated in FIG. 4, the tool holder device 36 comprises a self-locking means 52 according to the example in order to keep the tool holder device 36 in the hold condition H, also if a pressure loss in the second working chamber 43 occurs. According to the example, this is achieved by keeping the clamping body 39 in its clamping position I by means of the self-locking means 52. In the embodiment the self-locking means 52 is configured as mechanical self-locking means that transmits a traction force acting on the clamping body 39 in direction of the relief position II into a clamping force acting radially to the tool axis W. In doing so, an inhibition or blocking of the movement of the clamping body 39 in clamping direction R toward the relief position II is achieved. The self-locking means 52 can, e.g. effect the transmission of the tensioning force in the clamping force by means of a wedge surface gear transmission effect.

In an embodiment the self-locking means 52 comprises a wedge body 53 with a first wedge surface 54, a second wedge surface 55 and a third wedge surface 56. Because of the first, second and third wedge surface 54, 55, 56, the wedge body 53 tapers in clamping direction R in a direction into which the clamping body 39 moves during the movement into the relief position II. The first wedge surface 54 is in contact with a first wedge counter surface 56 of the holder body 40 in the clamping position I. The third wedge surface 56 is in contact with a third wedge counter surface 59 of the piston 41 in the clamping position I. Thus, the wedge body 53 is supported in the clamping position I of the clamping body 39 between the piston 41 and the holder body 40.

The wedge body 53 is moveably coupled with the clamping body 39 in clamping direction R and is, for example, seated in a recess of the clamping body 39. The wedge body 53 can be a wedge ring at the ring outer side of which the first wedge surface 54 and at the ring inner side of which the second wedge surface 55 and the third wedge surface 56 are formed. The ring surrounds the tool axis W and a cylindrical section of the piston 41, at which the second wedge counter surface 57 is formed. In clamping direction R the first wedge surface 54 and the first wedge counter surface 56 are arranged opposite each other or abut against each other.

If the clamping body 39 is moved in the clamping position I by means of the piston 41, the piston 41 urges the wedge body 53 by means of the second wedge counter surface 58 and the second wedge surface 55 radially outward away from the tool axis W first and against the first wedge counter surface 56 at the holder body 40. The second wedge surface 56 and the second wedge counter surface 58 that cooperate comprise an angle α with regard to the tool axis W of 45° according to the example, such that during the movement of the piston 41 in direction toward the clamping position I the wedge body 53 moves along a radial path that is substantially equal to the axial path the piston 41 travels. This means that the wedge body 53 nearly reaches its radial end position after a relatively short stroke movement of the piston 41. Shortly before reaching this radial end position, the third wedge surface 56 gets in contact with the third wedge counter surface 59. The third wedge surface 56 and the third wedge counter surface 59 that cooperate comprise an angle β with regard to the tool axis W that is smaller compared with the angle α and can have an amount of 2° to 5° according to the example. During the movement of the piston 41 in direction toward the clamping position I, the wedge body 53 travels only a very short radial path. The angle β is defined such that between the third wedge surface 56 and the third wedge counter surface 59 a self-locking effect is created.

If a pulling or tensioning force acts on the clamping body 39 in the clamping position I in the direction toward the relief position II, the wedge body 53 is urged due to this traction force in clamping direction R between the first wedge counter surface 57 and the third wedge counter surface 59 and effects—due to the small amount of the angle β—a large force radially to the tool axis W between the holder body 40, the wedge body 53 and the piston 41. Due to this large radial clamping force in connection with the self-locking effect between the third wedge surface 56 and the third wedge counter surface 59, the movement of the clamping body 39 in clamping direction R out of the clamping position I is hindered or blocked. A movement of the piston 41 in the clamping position I and thus a movement of the wedge body 53 as well as the clamping body 39 is reliably avoided by the self-locking effect between the third wedge surface 56 and the third wedge counter surface 59, even though a pressure loss occurs.

Figure 8:
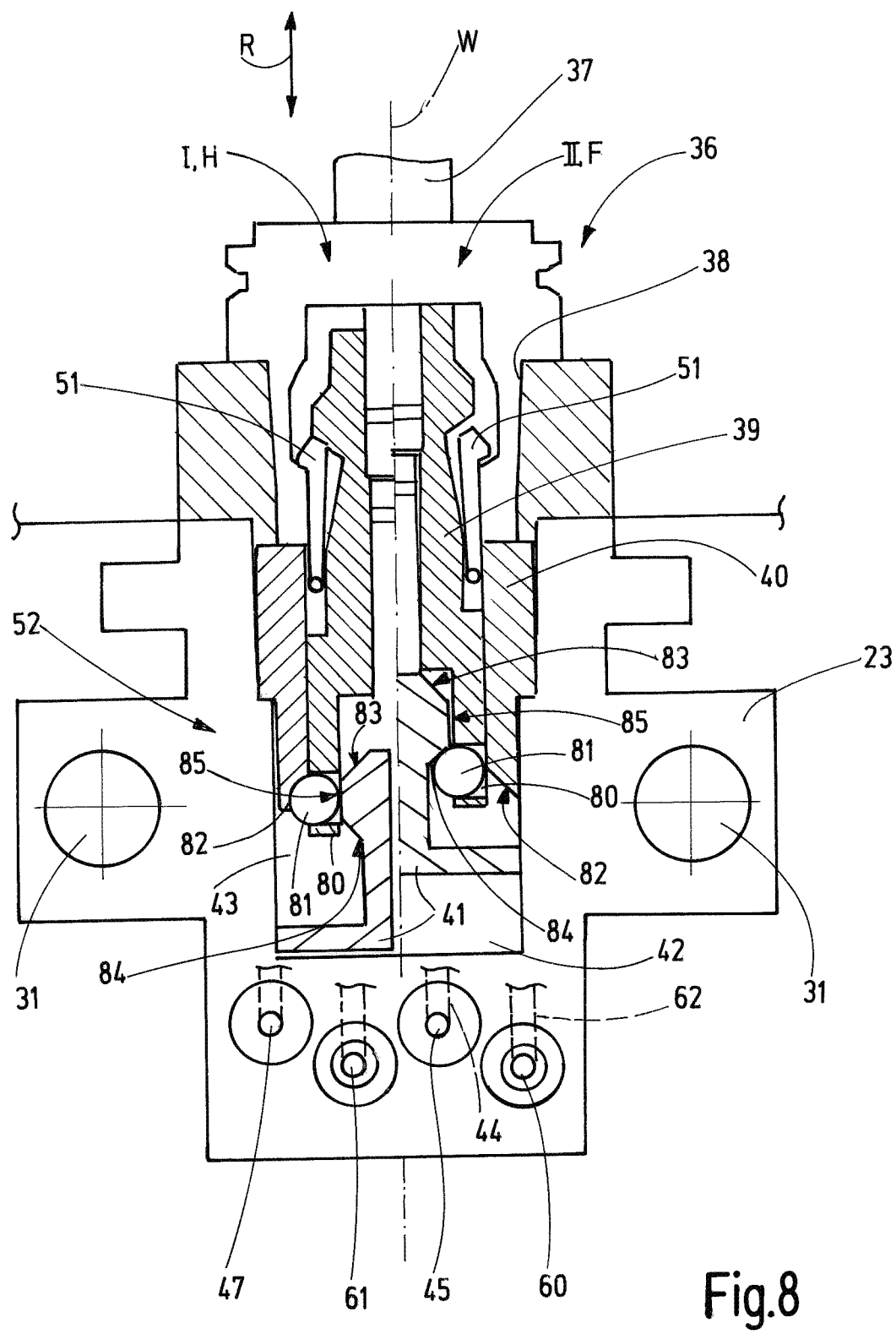

In FIG. 8 an alternative embodiment of self-locking means 52 is illustrated. Apart therefrom the embodiment of FIG. 8 corresponds to the embodiment shown in FIG. 4. Instead of a wedge body 53 in at least one radial recess 80 of the clamping body 39, one ball 81 is arranged respectively that is moveable radial to the tool axis W. At the holder body 40 at least one first inclined surface 82 is present that extends obliquely inclined to the tool axis W that approaches the tool axis W originating from a back end in the direction toward the front and in direction toward the collet elements 51. An individual inclined surface 82 can be assigned to each present ball 81 or at the holder body 40 a ring-like surrounding first inclined surface 81 can be present for all the balls 81.

Radially inward of the clamping body 39 in the range of the at least one radial recess 80 the piston 41 has a front section with a second inclined surface 83, a third inclined surface 84 and a peripheral surface 84 arranged between the second inclined surface 83 and the third inclined surface 84. In the range of the peripheral surface 85 the front section of the piston 41 has a diameter that substantially corresponds to the inner diameter of the clamping body 39 at the at least one radial recess 80. Starting from the peripheral surface 85 the second inclined surface 83 and the third inclined surface 84 extend obliquely inclined to the tool axis W and away from the peripheral surface 85 respectively. The second inclined surface 83 is arranged more closely to the collet elements 51 as the third inclined surface 84. By means of the second inclined surface 83, the third inclined surface 84 and the peripheral surface 85, the front section of the piston 41 has a peripheral area with a substantially trapezoid-shaped cross-section.

By actuation of the piston 41, the at least one ball 81 can be pressed out of the radial recess 80 in the clamping position I such that the at least one ball 81 abuts at the first inclined surface 82 of the holder body 40. Because the peripheral surface 85 is substantially parallel to the tool axis W, a self-locking effect is achieved.

In the relief position II the front section of the piston 41 is shifted to the front relative to the clamping body 39 such that the at least one ball 81 extends radially inward from the radial recess 80 and can abut in the area of the third inclined surface 84 at the piston 41. The at least one ball 81 does not or not remarkably extend radially outward out of the radial recess 80 such that the clamping body 39 with the at least one ball 81 can be moved at an inner surface or inner side of the holder body 40.

In the relief position II the clamping body 39 can be moved by backward movement of the piston 41 and with coupling of the at least one ball 81 so far, until at least one ball 81 can be moved radially outward along the first inclined surface 82 at the holder body 40. If the at least one ball 81 does not contact the third inclined surface 84 of the clamping body 39 anymore and is retained in its radial outer most position by the peripheral surface 85, the clamping position I is reached again.

In FIGS. 3 and 4 it is further schematically illustrated that in addition to the two hydraulic couplings 45, 47, compressed air coupling 60 and a cooling medium coupling 61 are present at the facing slide 23 or the tool holder device 36. The compressed air coupling 60 leads into the area of the tool holder space 38 via a compressed air line 62. There potentially present pollution, due to chips, cooling lubricating medium or the like, can be removed by means of the exiting compressed air 62 in order to allow a defined and accurate clamping of the tool 37. For this one or more air outlet openings can be present at the holder body 40 and/or the facing slide 23.

Via the cooling medium coupling 61 and a cooling medium line 63 that is fluidically connected therewith, cooling media or cooling lubricating media can be supplied in the area of the tool holder space 38 in order to cool or lubricate the tool 37 during machining of a workpiece.

In modification to the embodiment also only the compressed air coupling 60 or only the cooling medium coupling 61 can be present in addition to the at least one hydraulic coupling 45, 47.

In the embodiment illustrated here the two hydraulic couplings 45, 47 are locked or shut off by one shut-off valve 64 respectively. The shut-off valve 64 is unlockable such that a hydraulic medium flow in both flow directions is possible, this means in the assigned working chamber 42, 43 or out of the assigned working chamber 42, 43.

Figure 6:
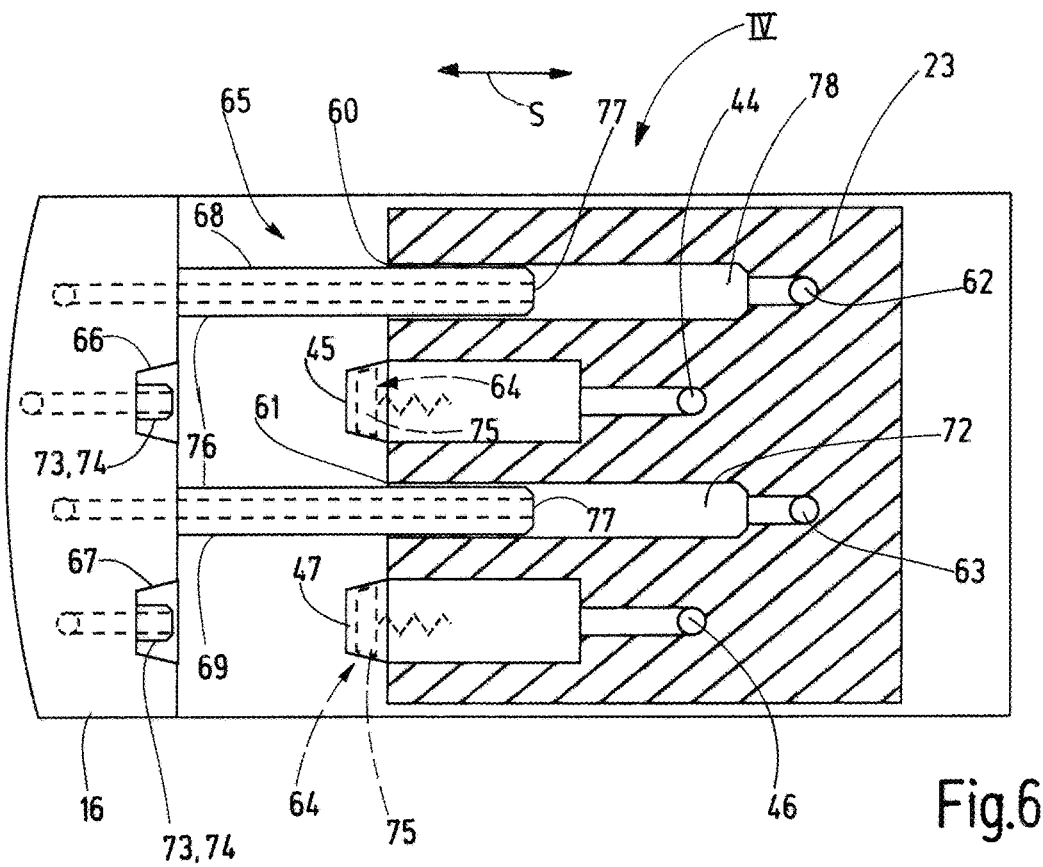
Figure 7:
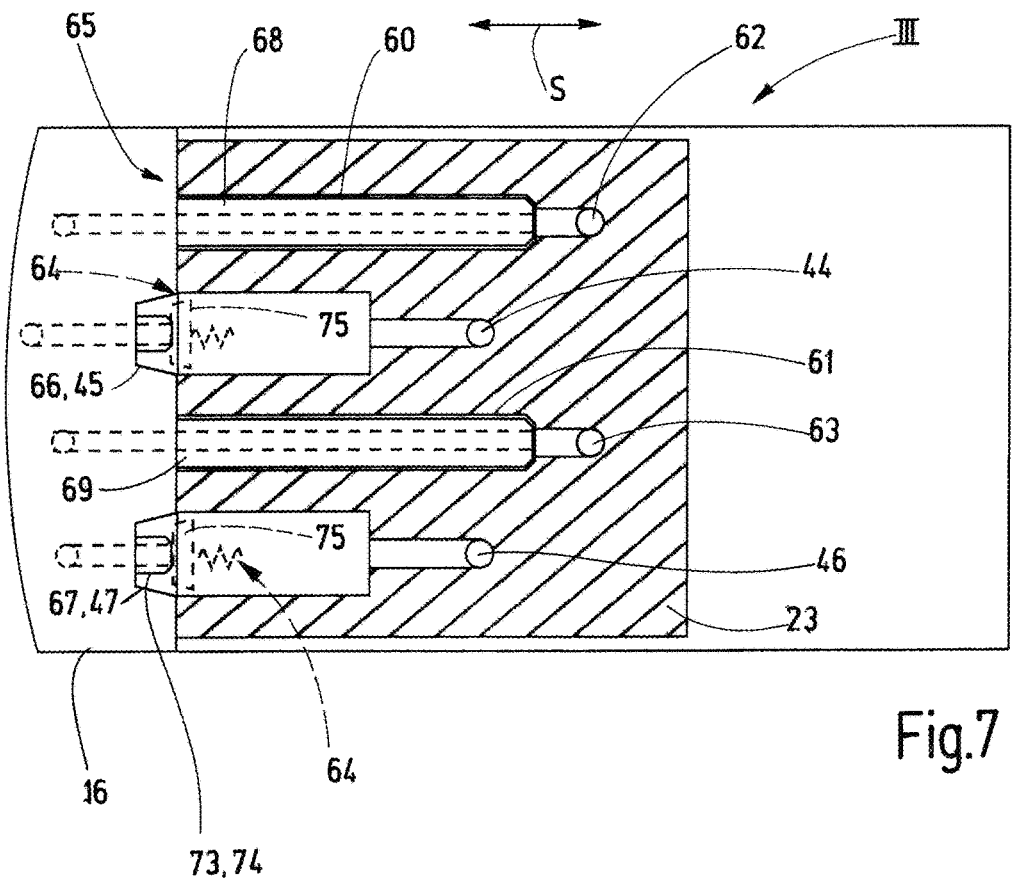

In FIGS. 6 and 7 it is highly schematically illustrated that the two hydraulic couplings 45, 47 as well as the optionally present additional couplings (compressed air coupling 60, cooling medium coupling 61) are arranged at a common connection side 65 of the facing slide 23 according to the example. At least the two hydraulic couplings 45, 47 are arranged at a common connection side 65 of the facing slide 23 and accessible from outside in shift direction S in order to allow the coupling of the assigned hydraulic control couplings or a decoupling of the assigned hydraulic control couplings of the housing body 16 by a movement of the facing slide 23.

As it has been already explained, the facing slide 23 can be moved relative to the housing body 16 in shift direction S by means of the adjustment device 24. Due to this movement, the facing slide 23 can be moved between a tool change position III (FIG. 7) and at least one working position IV (FIG. 6) that is offset from this tool change position III. Due to the movement of the facing slide 23 in the tool change position III, the switching of the tool holder device 36 from the hold condition H in the release condition F and vice versa is allowed. In the at least one working position IV a switching is impossible and the tool holder device 36 remains in the hold condition H, in which a tool is fixedly held in the tool holder device 36.

As is schematically illustrated in FIGS. 6 and 7, a first hydraulic control coupling 66, a second hydraulic control coupling 67, a compressed air supply coupling 68 and a cooling medium supply coupling 69 are present at the housing body 16. The first hydraulic control coupling 66 is assigned to the first hydraulic coupling 45 and the second hydraulic control coupling 67 is assigned to the second hydraulic coupling 47. A mechanical and fluidic connection between the hydraulic control couplings 66, 67 and the assigned hydraulic couplings 45, 47 only exists in the tool change position III of the facing slide 23. In this position the hydraulic couplings 45, 47 are in abutment or in insertion connection with the assigned hydraulic control couplings 66, 67 such that a fluid connection is possible.

In the at least one working position IV of the facing slide 23 the hydraulic couplings 45, 47 of the facing slide 23 or the tool holder device 36 are distant from the assigned hydraulic control couplings 66, 67 such that the shut-off valves 64 fluidically block the hydraulic lines 44, 46, as well as the working chambers 42, 43. An enclosed hydraulic medium volume and the respective adjusted hydraulic pressure remain in the facing slide 23 or the tool holder device 36.

The hydraulic control couplings 66, 67 each comprise an unlocking means 73 in order to switch the assigned shut-off valve 64 from the locking condition in a non-locking condition such that a fluid flow is allowed from the hydraulic control couplings 66, 67 into the hydraulic couplings 45, 47 or vice versa. In the embodiment the unlocking means 73 are formed by a nozzle 74 that presses in the tool change position III onto a valve member 75 of the respective shut-off valve 64 and lifts it from the respective valve seat such that a hydraulic flow around the valve member 75 is allowed. For example, the valve member 75 can be urged against the valve seat by a spring. In the tool change position III the nozzle 74 moves the valve member 75 against the force of the spring and unlocks the respective shut-off valve 64. The unlocked condition of the shut-off valves 64 is shown in FIG. 7.

As soon as the facing slide 23 moves out of the tool change position III, the valve members 75 are again urged in their locking position and lock the respective hydraulic volume in the facing slide 23 or the tool holder device 36.

Thus, no permanent hydraulic connection exists between the hydraulic control couplings 66, 67 at the housing body 16 and the hydraulic couplings 45, 47 of the facing slide 23. In doing so, flexible hydraulic lines are avoided. Concurrently it is guaranteed that the hydraulic pressure or the hydraulic volume inside the facing slide 23 or the tool holder device 36 remains unchanged in the at least one working position IV and that a tool 36 is reliably held.

Different to this the additional fluidic connections, according to the example the compressed air coupling and the cooling medium coupling, are maintained permanently and independent from the position of the facing slide 23. This is achieved by providing a supply tube 76 at each of the compressed air supply coupling 68 and the cooling medium supply coupling 69, wherein the supply tube 76 extends in shift direction S and comprises an outlet opening 77 for the respective medium (compressed air or cooling media) at its free end. The supply tubes 76 extend into an associated connection channel 78 in the facing slide 23 that is open at the connection side 65 and extends in shift direction S. The supply tubes 76 and the connection channels 78 are dimensioned in shift direction S such that the outlet opening 77 of the respective supply tube 76 is always positioned within the respective connection channel 78 in each position of the facing slide 23 relative to the housing body 16. In doing so, a telescopic fluid connection between the compressed air coupling 60 and the compressed air supply coupling 68, as well as between the cooling medium coupling 61 and the cooling medium supply coupling 69 is provided. Thus, independent from the position of the facing slide 23 relative to the housing body 16, a constant supply of the tool holder device 36 with compressed air and cooling media can be achieved.

It has to be understood that instead of the shown embodiments the supply tubes 76 could also be provided at the facing slide 23 and the assigned connection channels 78 could be provided in the housing body 16. The preferred embodiment shown in FIGS. 6 and 7 and described above has the advantage that the provided space can be better exploited.

By means of the facing head 15 described above, a tool 37 can be inserted or removed as explained in the following.

First, the facing slide 23 is moved in the tool change position III by means of the adjustment device 24 (FIG. 7). In this tool change position III the first working chamber 42 can be pressurized with hydraulic pressure in order to move the clamping body 39 in the relief position II. The tool holder device 36 is in the release condition F. If a tool 37 was held in the tool holder device 36, it can be removed now. If a tool change shall be carried out, the desired tool 37 can be taken out of a magazine by means of a gripping device and can be inserted in the tool holder device 36. After the insertion the tool holder device 36 is switched in the hold condition H. This is carried out by releasing the hydraulic pressure in the first working chamber 42 via the first hydraulic coupling 45 and the first hydraulic control coupling 66 and by increasing the hydraulic pressure in the second working chamber 43 via the second hydraulic coupling 47 and the second hydraulic control coupling 67. In doing so, the clamping body 39 moves in its clamping position I and as soon as it reaches the clamping position I, the tool holder device 36 takes its hold condition H. Subsequently the facing slide 23 can be moved out of the tool change position III in the desired working position IV. In doing so, the hydraulic connections between the hydraulic couplings 45, 47 and the assigned hydraulic control couplings 66, 67 at the housing body 16 are separated and the shut-off valves 64 are brought in their blocking condition. The hydraulic medium remains enclosed in the second working chamber 43.

If, however, a pressure loss in the second working chamber 43 occurs, a reliably holding of the tool 37 in the tool holder device 36 is guaranteed due to the above-explained self-locking effect achieved by the self-locking means 52.

In each working position IV of the facing slide 23 the compressed air coupling and the cooling medium coupling are maintained such that during the machining of a workpiece, compressed air and cooling media is available at the tool holder device 36 or the facing slide 23 respectively.

The invention refers to a facing head 15 as well as a method for inserting a tool 37 into and/or removing a tool 37 from a tool holder device 36 of the facing head 15. The facing head 15 has a spindle coupling device 17 for exchangeably coupling with a spindle chuck 18 of a working spindle 11 of a machine tool 10. The facing head 15 has a housing body 16 at which or in which a facing slide 23 is moveably supported in a guided manner and is preferably linearly guidably supported. The facing slide 23 supports the tool holder device 36. The tool holder device 36 is hydraulically controllable. For this the tool holder device 36 or the facing slide 23 comprises a hydraulic coupling 45, 47 that is mechanically and hydraulically coupled with an associated hydraulic control coupling 66, 67 of the housing body 16 in a tool change position III of the facing slide 23. Remote from the tool change position III, the mechanical and hydraulic connection between the hydraulic coupling 45, 47 and the associated hydraulic control coupling 66, 67 is interrupted. In the tool change position III a switching of the tool holder device 36 between a hold condition H holding the tool 37 and a release condition F releasing the tool 37 can be carried out by a respective pressurization with hydraulic pressure.

LIST OF REFERENCE SIGNS

10 machine tool
11 working spindle
12 slide
13 machine frame
14 workpiece holder
15 facing head
16 housing body
17 spindle coupling device
18 spindle chuck
19 hollow shank taper 20 grip body
21 media interface
23 facing slide
24 adjustment device
25 adjustment gear transmission
26 shaft coupling
27 input shaft
28 output shaft
29 spur gear
30 bevel gear
31 threaded spindle
32 screw nut
33 gear transmission branch
34 gear transmission shaft
36 tool holder device
37 tool
38 tool holder space
39 clamping body
40 holder body
41 piston
42 first working chamber
43 second working chamber
44 first hydraulic line
45 first hydraulic coupling
46 second hydraulic line
47 second hydraulic coupling
51 collet element
52 self-locking means
53 wedge body
54 first wedge surface
55 second wedge surface
56 third wedge surface
57 first wedge counter surface
58 second wedge counter surface
59 third wedge counter surface
60 compressed air coupling
61 cooling medium coupling
62 compressed air line
63 cooling medium line
64 shut-off valve
65 connection side
66 first hydraulic control coupling
67 hydraulic control coupling
68 compressed air supply coupling
69 cooling medium supply coupling
73 unlocking means
74 nozzle
75 valve member
76 supply tube
77 outlet opening
78 connection channel
80 radial recess
81 ball
82 first inclined surface
83 second inclined surface
84 third inclined surface
85 peripheral surface
I clamping position
II relief position
III tool change position
IV working position
D rotation axis
F release condition
H hold condition
R clamping direction
S shift direction
W workpiece axes
x axis distance

What is claimed is:

1. A facing head for use in a machine tool that comprises at least one working spindle, the facing head comprising:
a housing body that comprises a spindle coupling device that is configured to be exchangeably coupled with a spindle chuck of the working spindle of the machine tool, wherein the spindle coupling device is arranged coaxially to a rotation axis;
a facing slide that is moveably supported in a guided manner at or in the housing body, wherein a hydraulically controllable tool holder device is arranged at the facing slide configured for holding a tool, wherein the facing slide and/or the tool holder device comprises at least one hydraulic coupling by means of which a hydraulic pressure in at least one working chamber of the tool holder device can be changed in order to switch the tool holder device between a hold condition holding the tool and a release condition releasing the tool; and
an adjustment device that is configured to move the facing slide relative to the housing body between a tool change position and at least one working position that is different from the tool change position, wherein in the tool change position the at least one hydraulic coupling of the tool holder device is fluidically connected with a hydraulic control coupling provided at the housing body and wherein in the at least one working position the at least one hydraulic coupling is fluidically disconnected from the hydraulic control coupling.

2. The facing head according to claim 1, wherein the hydraulic control coupling comprises an unlockable shut-off valve.

3. The facing head according to claim 2, wherein an unlocking means is present at the hydraulic control coupling that is configured to unlock the shut-off valve.

4. The facing head according to claim 3, wherein the tool holder device comprises a clamping body that is moveably arranged in clamping direction in a holder body, wherein the tool holder device is in the hold condition, if the clamping body is in a clamping position and wherein the tool holder device is in a release condition, if the clamping body is in a relief position.

5. The facing head according to claim 4, wherein the tool holder device comprises a first working chamber fluidically connected with a first hydraulic coupling of the at least one hydraulic coupling, wherein the first working chamber is fluidically sealingly closed at one side by a moveable piston, wherein the piston is moveably coupled with the clamping body.

6. The facing head according to claim 5, wherein the tool holder device comprises a second working chamber that is fluidically coupled with a second hydraulic coupling of the at least one hydraulic coupling, wherein the first working chamber and the second working chamber are fluidically separated from each other by the piston.

7. The facing head according to claim 6, wherein the tool holder device comprises self-locking means that is configured to keep the clamping body in the clamping position by a self-locking effect.

8. The facing head according to claim 5, wherein the tool holder device comprises self-locking means that is configured to keep the clamping body in the clamping position by a self-locking effect, and wherein the self-locking means comprise a wedge body that is supported in the clamping position with a first wedge surface at the holder body and with a second wedge surface at the piston.

9. The facing head according to claim 1, wherein the tool holder device comprises a clamping body that is moveably arranged in clamping direction in a holder body, wherein the tool holder device is in the hold condition, if the clamping body is in a clamping position and wherein the tool holder device is in a release condition, if the clamping body is in a relief position.

10. The facing head according to claim 9, wherein the tool holder device comprises a first working chamber fluidically connected with a first hydraulic coupling of the at least one hydraulic coupling, wherein the first working chamber is fluidically sealingly closed at one side by a moveable piston, wherein the piston is moveably coupled with the clamping body.

11. The facing head according to claim 10, wherein the tool holder device comprises a second working chamber that is fluidically coupled with a second hydraulic coupling of the at least one hydraulic coupling, wherein the first working chamber and the second working chamber are fluidically separated from each other by the piston.

12. The facing head according to claim 10, wherein the tool holder device comprises self-locking means that is configured to keep the clamping body in the clamping position by a self-locking effect, and wherein the self-locking means comprise a wedge body that is supported in the clamping position with a first wedge surface at the holder body and with a second wedge surface at the piston.

13. The facing head according to claim 12, wherein the wedge body is moveably coupled with the clamping body.

14. The facing head according to claim 9, wherein the tool holder device comprises self-locking means that is configured to keep the clamping body in the clamping position by a self-locking effect.

15. The facing head according to claim 1, wherein the facing slide and/or the tool holder device comprises in addition a compressed air coupling and/or a cooling medium coupling.

16. The facing head according to claim 15, wherein the compressed air coupling and/or the cooling medium coupling is/are always fluidically connected with a respective compressed air supply coupling or a cooling medium supply coupling provided at the housing body independent from a position of the facing slide relative to the housing body.

17. The facing head according to claim 1, wherein the tool holder device and/or the spindle coupling device is a standardized interface or are standardized interfaces.

18. The facing head according to claim 17, wherein the spindle coupling device is a hollow shank taper and/or the tool holder device is a holder configured for a hollow shank taper.

* * * * *